United States Patent [19]

Hattori et al.

[11] Patent Number: 4,882,255
[45] Date of Patent: Nov. 21, 1989

[54] AZO PHOTOCONDUCTOR FOR ELECTROPHOTOGRAPHY

[75] Inventors: Yoshimasa Hattori; Noboru Furusho, both of Kawasaki, Japan

[73] Assignee: Fuji Electric Co., Ltd., Kawasaki, Japan

[21] Appl. No.: 287,081

[22] Filed: Dec. 21, 1988

[30] Foreign Application Priority Data

Dec. 28, 1987 [JP] Japan ................... 62-332366

[51] Int. Cl.$^4$ ............................................. G03G 5/06
[52] U.S. Cl. .................................. 430/73; 430/74; 430/75; 430/76; 430/58
[58] Field of Search ............... 430/58, 73, 74, 75, 430/76

[56] References Cited

U.S. PATENT DOCUMENTS 3,484,237 12/1969 Shattuck et al. ................ 430/80
4,783,387 11/1988 Ueda .............................. 430/79

FOREIGN PATENT DOCUMENTS 1078572 5/1972 Japan .
3754372 12/1972 Japan .

Primary Examiner—John L. Goodrow
Attorney, Agent, or Firm—Spencer & Frank

[57] ABSTRACT

A photoconductor for electrophotography comprises a novel disazo compound as a charge generating substance. A disazo compound is represented by the following general formula:

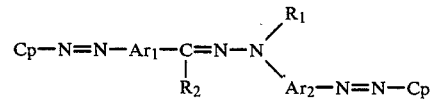

wherein,
each of $Ar_1$ and $Ar_2$ stands for an aromatic hydrocarbon group or an aromatic heterocyclic group, both of which may have a substituent(s),
each of $R_1$ and $R_2$ stands for an hydrogen atom or an alkyl group or an aryl group, a heterocyclic group which may have a substituent(s); and
$C_p$ stands for a coupler residual group.

4 Claims, 1 Drawing Sheet

AZO PHOTOCONDUCTOR FOR ELECTROPHOTOGRAPHY

BACKGROUND OF THE INVENTION

1. Field of the Invention

The present invention relates to a photoconductor for electrophotography, and particularly to a photoconductor for electrophotography which contains a disazo compound in the photosensitive layer thereof formed on an electroconductive substrate.

2. Description of the Prior Art

Photosensitive materials which have heretofore been used in photoconductors for electrophotography include inorganic photoconductive substances such as selenium and selenium alloys, dispersions of inorganic photoconductive substances such as zinc oxide and cadmium sulfide in resin binders, organic polymeric photoconductive substances such as poly-N-vinylcarbazole and polyvinylanthracene, organic photoconductive substances such as phthalocyanine compounds and bisazo compounds, and dispersions of such organic polymeric photoconductive substances in resin binders.

Photoconductors are required to have a function of maintaining a surface electric charge in the dark, a function of generating an electric charge upon receiving light, and a function of transporting an electric charge upon receiving light. They are classified into two types of photoconductors, namely so-called monolayer type photoconductors, and so-called laminate type photoconductors. The former comprises a single layer having all of the above-mentioned three functions, and the latter comprises functionally distinguishable laminated layers, one of which contributes mainly to the generation of electric charge, and another of which contributes to the retention of surface electric charge in the dark and the electric charge transportation upon receiving light. In an electrophotographic method using a photoconductor of the kind as mentioned above, for example, the Carlson's system is applied to image formation. The image formation according to this system comprises steps of subjecting a photoconductor in the dark to corona discharge to charge the photoconductor, illuminating the surface of the charged photoconductor with imagewise light based on a manuscript or copy bearing, e.g., letters and/or pictures to form a latent electrostatic image, developing the formed latent electrostatic image with a toner, and transferring the developed toner image to a support such as a paper sheet to fix the toner image on the support. After the toner image transfer, the photoconductor is subjected to the steps of removal of the electric charge, removal of the remaining toner (cleaning), neutralizaiton of the residual charge with light (erasion), and so on to be ready for reuse.

Photoconductors for electrophotography in which use is made of an organic material(s) have recently been put into practical use by virtue of the advantageous feature(s) of the organic material(s) such as flexibility, thermal stability, and/or a film forming capacity. They include a photoconductor comprising poly-N-vinylcarbazole and 2,4,7-trinitrofluoren-9-one (disclosed in U.S. Pat. No. 3,484,237), a photoconductor using an organic pigment as the main component (disclosed in Japanese Patent Laid-Open No. 37,543/1972), and a photoconductor using as the main component a eutectic complex composed of a dye and a resin (disclosed in Japanese Patent Laid-Open No. 10,785/1972). A number of novel azo compounds or perylene compounds have also been put into practical use for photosensitive members.

Although organic materials have a number of advantageous features mentioned above with which inorganic materials are not endowed, however, the fact is that there have been obtained no organic materials fully satisfying all the characteristics required of a material to be used in photoconductors for electrophotography at the present. Particular problems involved in organic materials have been concerned with photosensitivity and characteristics in continuous repeated use.

SUMMARY OF THE INVENTION

An object of the present invention is to provide a photoconductor for electrophotography to be used in copying apparatuses and printers which member has a high photosensitivity and excellent characteristics in repeated use, through the use, in the photosensitive layer, of a novel organic materials not used to date as a charge generating substance.

In order to achieve the object of the present invention, a photoconductor for electrophotography comprises:

at least one disazo compound represented by the following general formula (I):

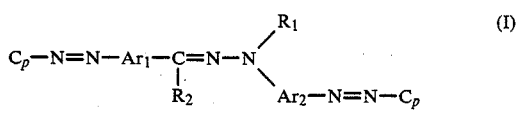

wherein, each of $Ar_1$ and $Ar_2$ stands for an aromatic hydrocarbon group, an aromatic heterocyclic group, each of which may have a substituent(s);

each of $R_1$ and $R_2$ stands for a hydrogen atom, or an alkyl group, an aryl group, or a heterocyclic group, each of which may have a substituent(s);

$C_p$ stands for a coupler residual group.

Here, the coupler residual group $C_p$ may have one of the structures represented by the following general formulae (II) to (V);

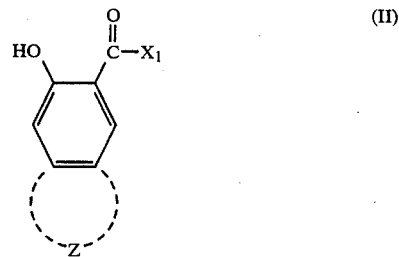

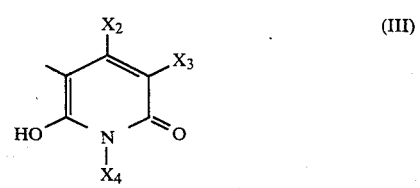

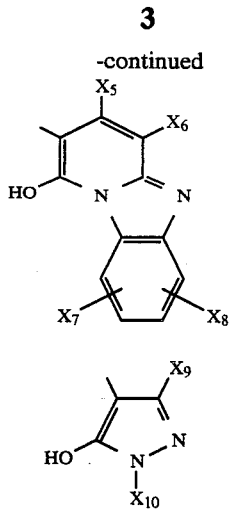

wherein,

Z stands for a residual group which forms a polycyclic armoatic ring or heterocyclic ring by condensating with a benzene ring, $X_1$ stands for an $OR_3$ or $NR_4R_5$ (each of $R_3$, $R_4$ and $R_5$ stands for a hydrogen atom, an alkyl group, an aryl group or an aromatic heterocyclic group;

each of $X_2$ and $X_5$ stands for an alkyl group, an aryl group, an aromatic heterocyclic group, each of which may have a substituent(s), each of $X_3$ and $X_6$ stands for a hydrogen atom, a cyano group, a carbamoyl group, a carboxyl group, an ester group or an acyl group, $X_4$ stands for a hydrogen atom or an alkyl group, an cycloalkyl group, an alkenyl group, an aryl group or an aromatic heterocyclic group, each of which may have a substituent(s), each of $X_7$ and $X_8$ stands for a hydrogen atom, a halogen atom, a nitro group or an alkyl group or an alkoxy group which may have a substituent(s), $X_9$ stands for an alkyl group, an aryl group, an carboxy group; and $X_{10}$ stands for an aryl group or an aromatic heterocyclic group, both of which may have a substituent(s).

The photoconductor may comprise including a dispersion of a charge generating substance selected from disazo compounds represented by the general formula (I) and a charge transporting substance in a binder resin.

The photoconductor may comprise a laminate of a charge transporting layer mainly composed of a charge transporting substance and a charge generating layer including a compound selected from disazo compounds represented by the general formula (I).

The above and other objects, effects, features and advantages of the present invention will become more apparent from the following description of embodiments thereof taken in conjunction with the accompanying drawings.

DETAILED DESCRIPTION OF PREFERRED EMBODIMENTS

Figure 1:
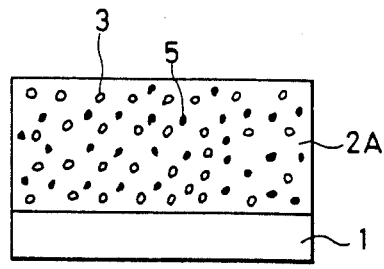
FIGS. 1 to 3 are schematic cross-sectional views of photoconductors according to the present invention.
Figure 2:
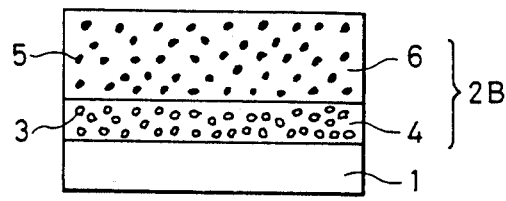
Figure 3:
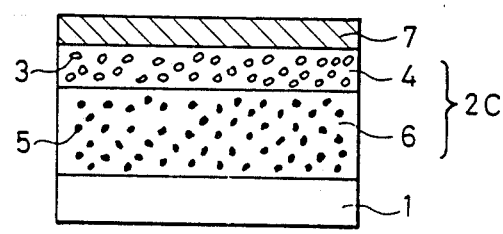

FIGS. 1, 2 and 3 are schematic cross-sectional views of different embodiments of the photoconductor of the present invention, respectively.

FIG. 1 shows a monolayer type photoconductor. A photosensitive layer 2A is provided on an electroconductive substrate 1. The photosensitive layer 2A comprises a disazo compound as a charge generating substance 3 and a charge transporting substance 5 both of which substances are dispersed in a resin binder matrix so that the photosensitive layer 2A functions as photoconductor.

FIG. 2 shows a laminate type photoconductor. A laminated photosensitive layer 2B is provided on an electroconductive substrate 1, a lower layer of the laminate is a charge generating layer 4 including a disazo compound as a charge generating substance 3 and an upper one is a charge transporting layer 6 containing a charge transporting substance 5 as the main component, so that the photosensitive layer 2B functions as a photoconductor. This photoconductor is usually used according to the negative charge mode.

FIG. 3 shows another laminate type photoconductor having a layer structure in reverse to that of FIG. 2. A laminated photosensitive layer 2C is provided on an electroconductive substrate 1, a lower layer of the laminate is a charge transporting layer 6 and an upper one is a charge generating layer 4 including a disazo compound as a charge generating substance 3. The photosensitive layer also functions as a photoconductor. This photoconductor is usually used according to the positive charge mode. In this case, a covering layer 7 may generally be further provided as shown in FIG. 3 to protect the charge generating layer 4.

Thus, in the case of laminate type photoconductors, the charge mode therefor differs from layer structure to layer structure. The reason for this is that, even if any photoconductor with the layer structure as shown in FIG. 2 is to be used in the positive charge mode, no charge transporting substances adaptable to the positive charge mode have been found yet. Accordingly, when any laminate type photoconductor is to be used in the positive charge mode, the photoconductor is required of a layer structure as shown in FIG. 3 at present.

A photoconductor as shown in FIG. 1 can be produced by dispersing a charge generating substance in a solution of a charge transporting substance and a resin binder and applying the resulting dispersion on an electroconductive substrate.

A photoconductor as shown in FIG. 2 can be prepared by depositing a charge generating substance on an electroconductive substrate by means of vacuum evaporation or applying and drying a dispersion of a particulate charge generating substance in a solvent and/or a resin binder on an electroconductive substrate, followed by applying a solution of a charge transporting substance and a resin binder on the resulting layer and drying.

A photoconductor as shown in FIG. 3 can be prepared by applying and drying a solution of a charge transporting substance and a resin binder on an electroconductive substrate, and depositing a charge generating substance on the resulting coating layer by means of vacuum evaporation or coating and drying a dispersion of a particulate charge generating substance in a solvent and/or a resin binder on the coating layer, followed by formation of a covering layer.

The electroconductive substrate 1 serves as an electrode of the photoconductor and as a support for a layer(s) formed thereon. The electroconductive substrate may be in the form of a cylinder, a plate or a film, and may be made of a metallic material such as aluminum, stainless steel or nickel, or other material having a surface treated to be electroconductive, such as glass so treated or a resin so treated.

The charge generating layer 4 is formed by application of a dispersion of a disazo compound as a charge generating substance 3 in a resin binder or by deposition of a charge generating substance by means of vacuum evaporation, or the like technique as described above, and this layer generates an electric charge upon receiving light. It is important that the charge generating layer 4 be high not only in charge generating efficiency but also in capability of injecting the generated electric charge into the charge transporting layer 6 and any covering layer 7, which capability is desirably as little dependent upon the electric field as possible and high even in low intensity electric fields. It also is possible to form a charge generating layer using a charge generating substance as a main component in admixture with a charge transporting substance and so on. Resin binders usable in the charge generating layer include polycarbonates, polyesters, polyamides, polyurethanes, epoxy resins, silicone resins, and methacrylate homopolymer and copolymers, which may be used either alone or in appropriate combination.

The charge transporting layer 6 is a coating film containing a hydrazone compound, a pyrazoline compound, a styryl compound, a tri-phenyl-amine compound, an oxazole compound or an oxadiazole compound as an organic charge transporting substance in a resin binder. The charge transporting layer serves as an insulator layer in the dark so as to retain the electric charge of the photosensitive member, and fulfills, a function of transporting an electric charge injected from the charge generating layer upon receiving light. Resin binders usable in the charge transporting layer include polycarbonates, polyesters, polyamides, polyurethanes, epoxy resins, silicone resins, and methacryate homopolymer and copolymers.

The covering layer 7 has a function of receiving and retaining an electric charge generated by corona discharge in the dark and a capability of transmitting light to which the charge generating layer should respond. It is necessary that the covering layer transmits light upon exposure of the photoconductor and allows the light to reach the charge generating layer, and then undergoes the injection of an electric charge generated in the charge generating layer to nuetralize and erases a surface electric charge. Materials usable in the covering layer include organic insulating film-forming materials such as polyesters and polyamides. Such organic materials may also be used in mixture with an inorganic material such as a glass resin or $SiO_2$, or an electric resistance-lowering material such as a metal or a metallic oxide. Materials usable in the covering layer are not limited to organic insulating film-forming materials, and further include inorganic materials such as $SiO_2$, metals, and metallic oxides, which may be formed on a covering layer by an appropriate method such as vacuum evaporation and deposition, or sputtering. From the viewpoint of the aforementioned description, it is desirable that the material to be used in the covering layer be as transparent as possible in the wavelength range wherein the charge generating substance attains maximum light absorption.

Although the thickness of the covering layer depends on the material or composition thereof, it can be arbitrarily set in so far as it does not produce any adverse effects including an increase in a residual potential in continuous repeated use.

The disaso compound to be used in the present invention is represented by the following general formula (I):

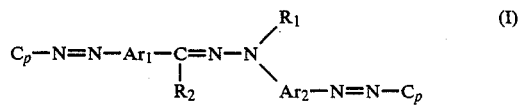

wherein, each of $Ar_1$ and $Ar_2$ stands for an aromatic hydrocarbon group, or an aromatic heterocyclic group, both of which may have a substituent(s);

each of $R_1$ and $R_2$ stands for a hydrogen atom or an alkyl group, an aryl group or a heterocyclic group, each of which may have a substituent(s), and $C_p$ stands for a coupler residual group.

In the disazo compound represented by the general formula (I), $C_p$ preferably has one of the structures represented by the following general formulae (II) to (V).

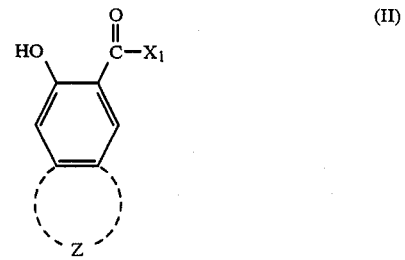

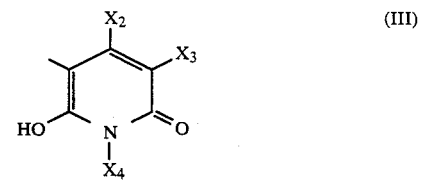

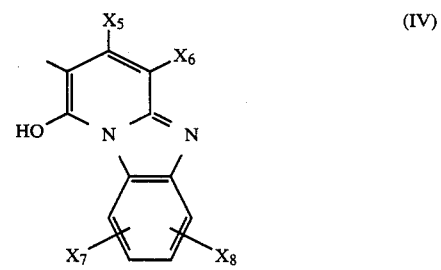

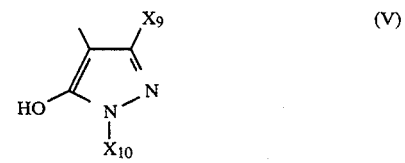

Wherein,

Z stands for a residual group which forms a polycyclic aromatic ring or heterocyclic ring by condensating with a benezene ring, $X_1$ stands for an $OR_3$ or an $NR_4R_5$ (each of $R_3$, $R_4$ and $R_5$ stands for a hydrogen atom, an alkyl group, or an aryl group or an aromatic heterocyclic group), each of $X_2$ and $X_5$ stands for an alkyl group, an aryl gorup or an aromatic heterocyclic group each of which may have a substituent(s), each of $X_3$ and $X_6$ stands for a hydrogen atom, a cyano group, a carbamoyl group, a carboxyl group, an ester group or an acyl group, $X_4$ stands for a hydrogen atom or an alkyl group, a cycloalkyl group, an alkenyl group, an aryl group or an aromatic hetrocyclic group, each of which may have a substituent(s), each of $X_7$ and $X_8$ stands for a hydrogen atom, a halogen atom, a nitro group, an alkyl group which may have a substituent(s) or an alkoxy group which may have a substituent(s), $X_9$ stands for an alkyl group, an aryl group, or a carboxyl group and $X_{10}$ stands for an aryl group or an aromatic heterocyclic group both of which may have a substituent(s).

These diazo compounds represented by the general formula (I) can be synthesized according to the following process, that is an amino compound represented by one of the following general formula

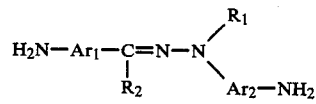

is diazotized by the usual method and the resultant diazo compound is coupling reacted with a corresponding coupler in a suitable solvent (for example, N,N-dimethylformamide or dimethyl sulfoxide) in the presence of an alkali.

Specific examples of disazo compounds of the general formula (I) prepared in the above-mentioned manner include:

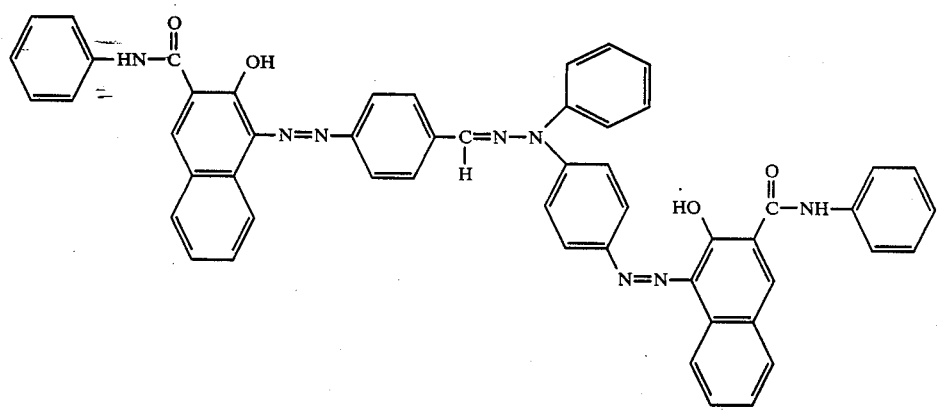

Compound No. 1

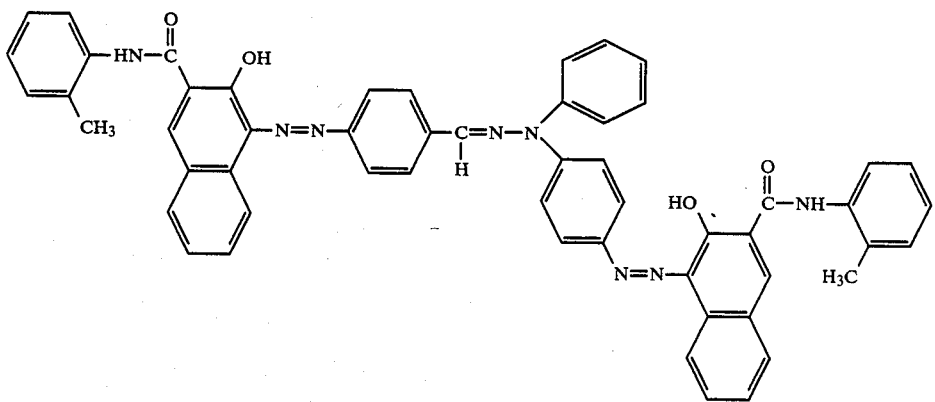

Compound No. 2

-continued
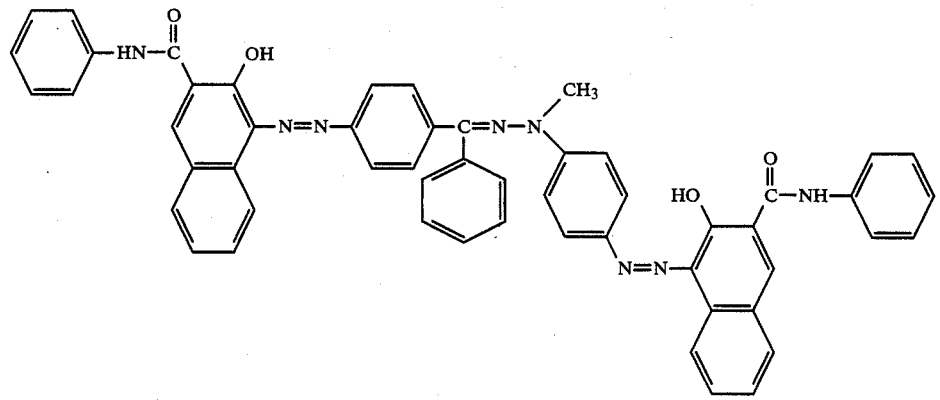
Compound No. 3
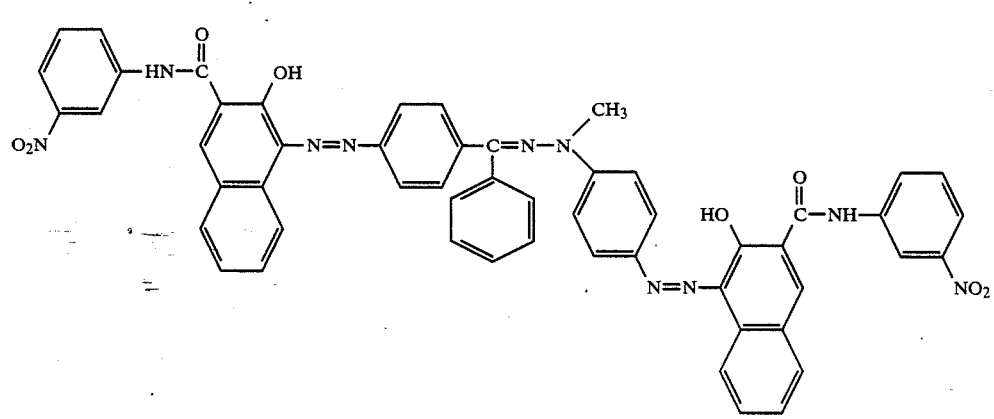
Compound No. 4
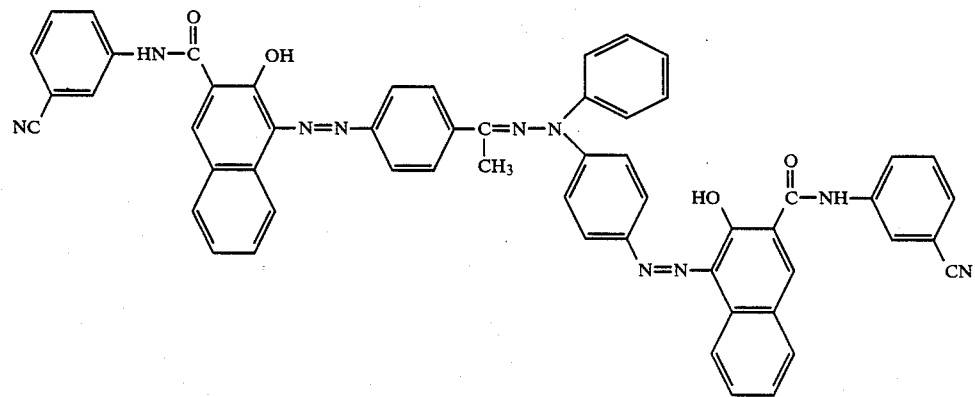
Compound No. 5

-continued
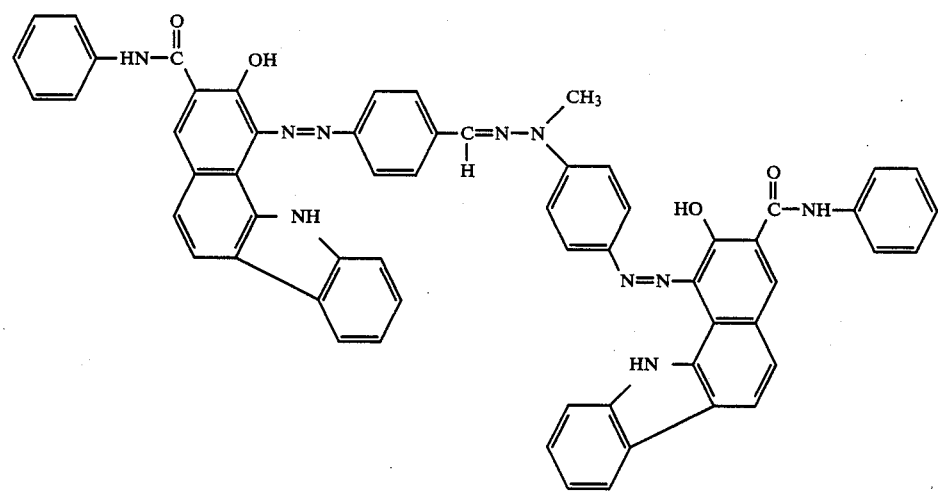
Compound No. 6
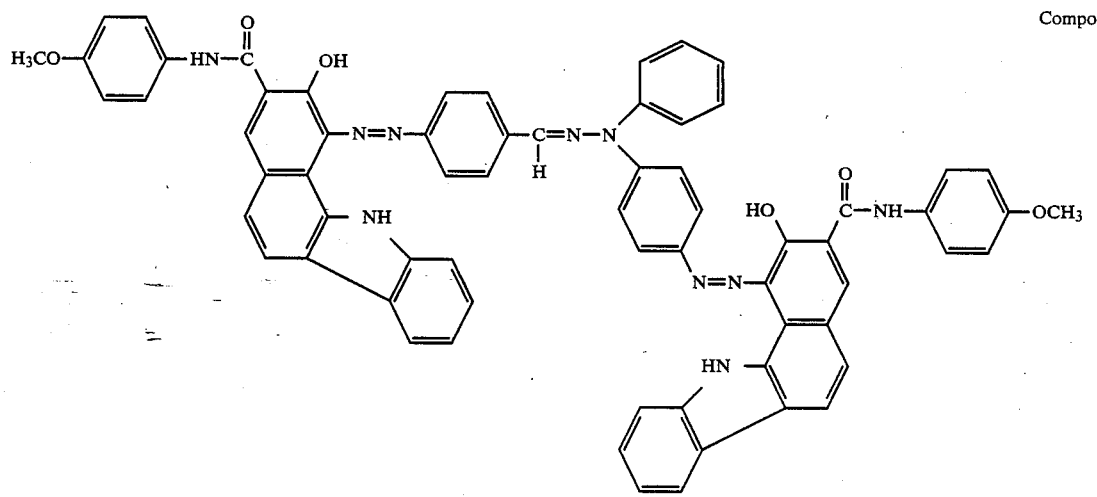
Compound No. 7
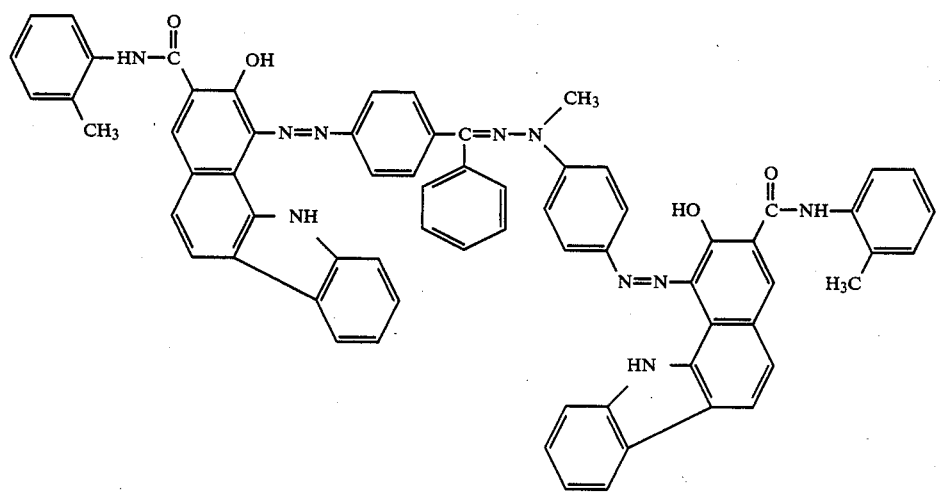
Compound No. 8

-continued
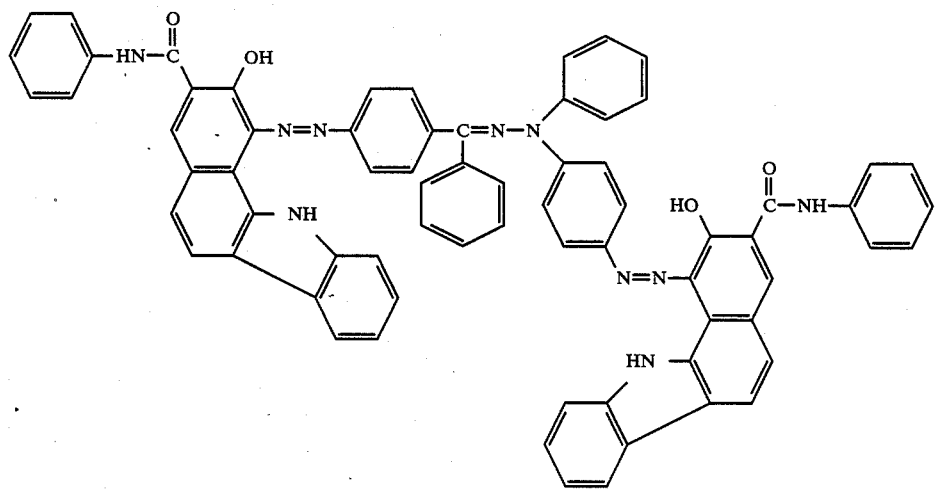
Compound No. 9
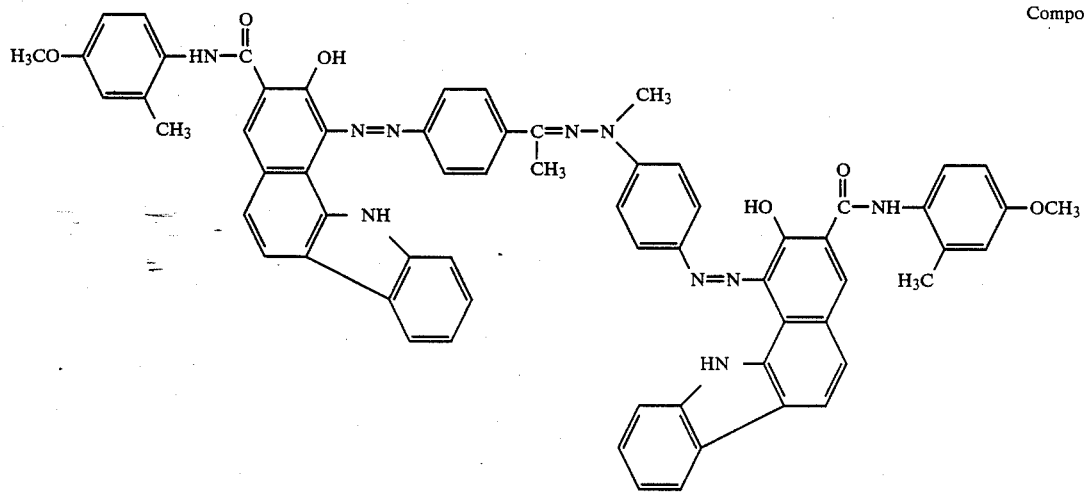
Compound No. 10
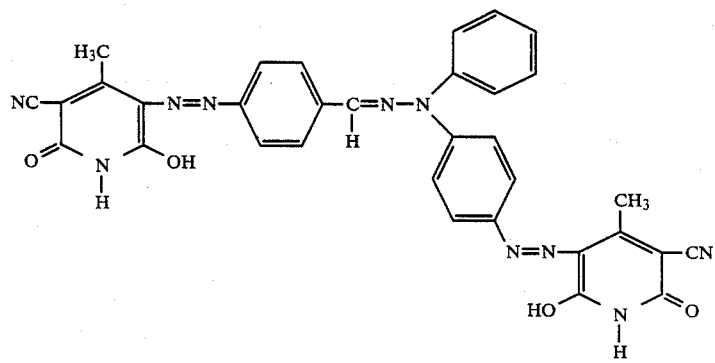
Compound No. 11

-continued
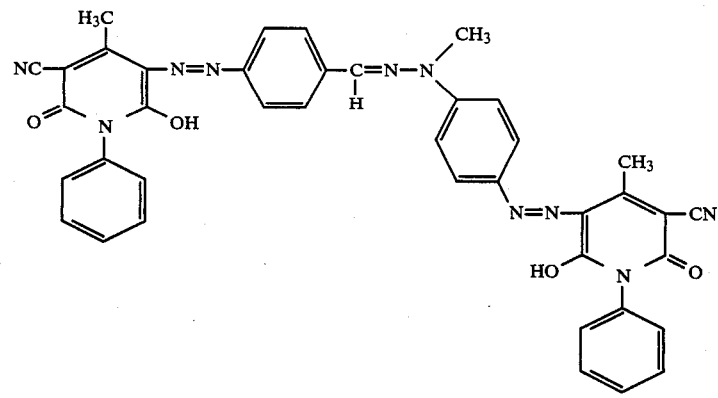
Compound No. 12
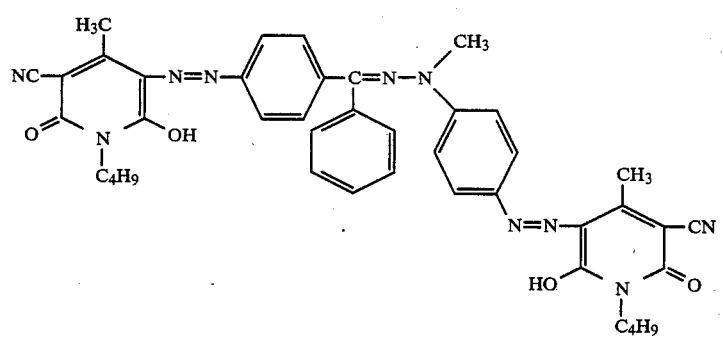
Compound No. 13
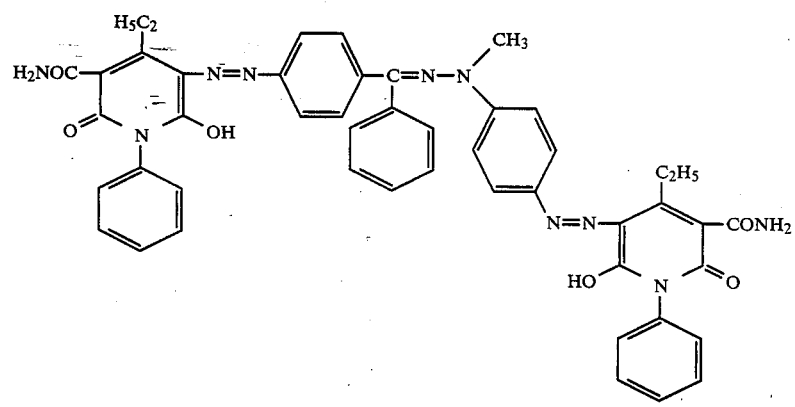
Compound No. 14
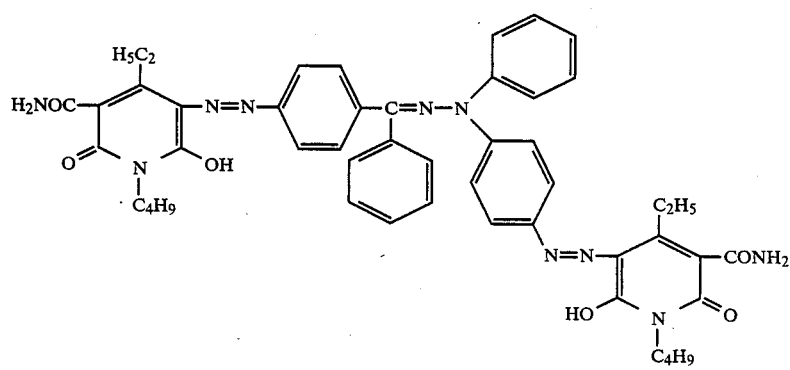
Compound No. 15

-continued
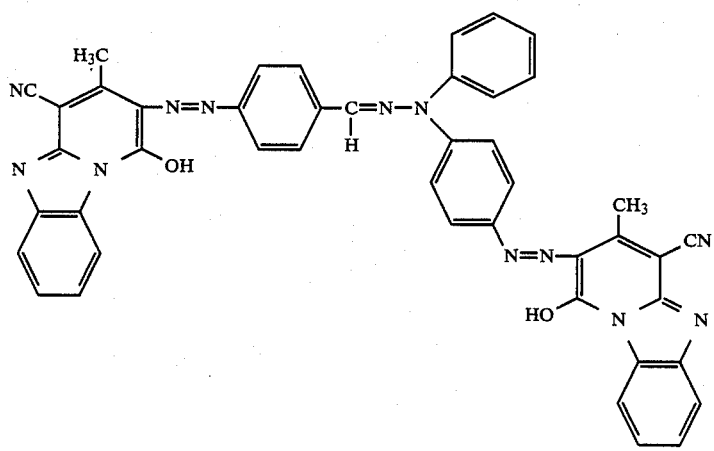
Compound No. 16
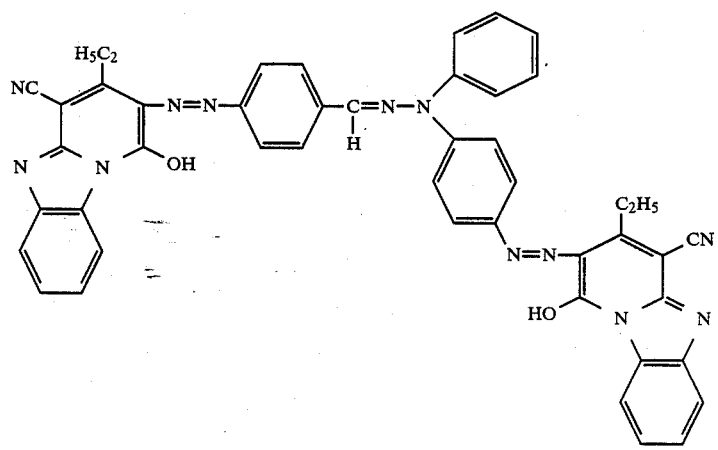
Compound No. 17
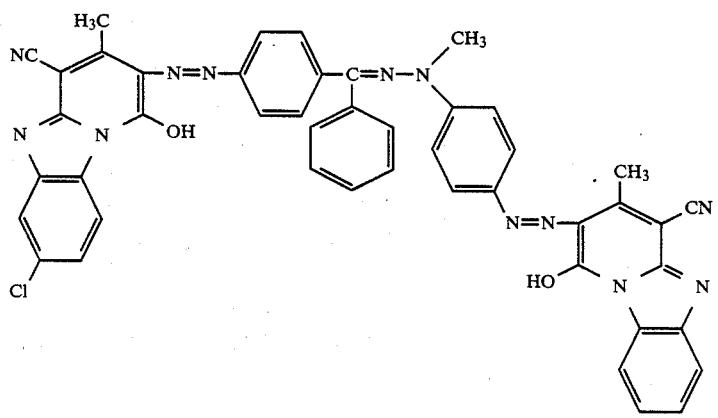
Compound No. 18

-continued
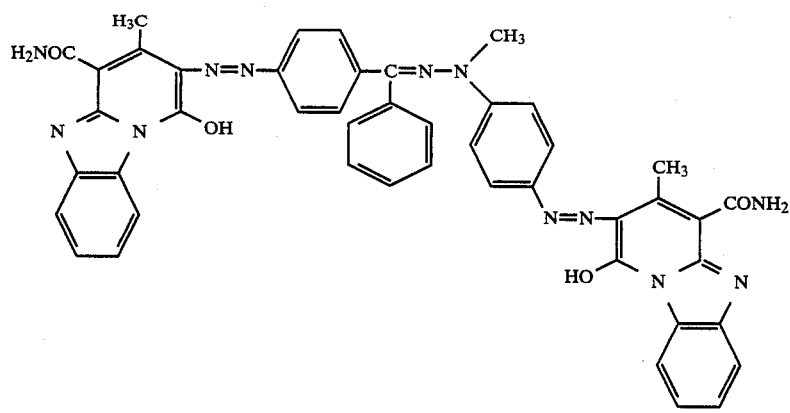
Compound No. 19
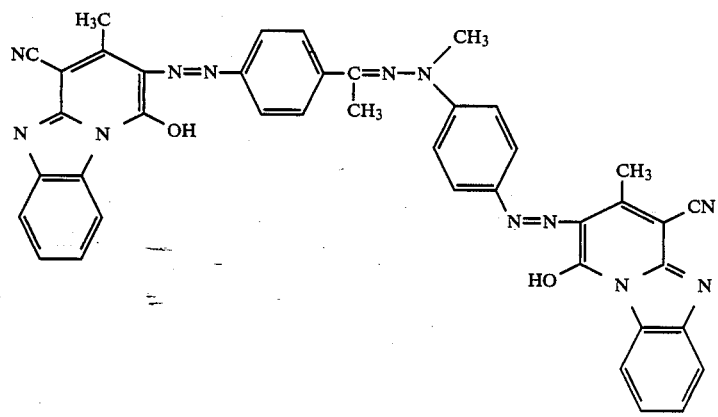
Compound No. 20
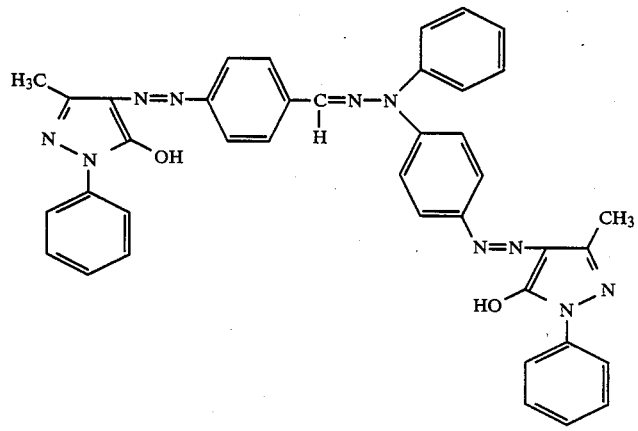
Compound No. 21

-continued
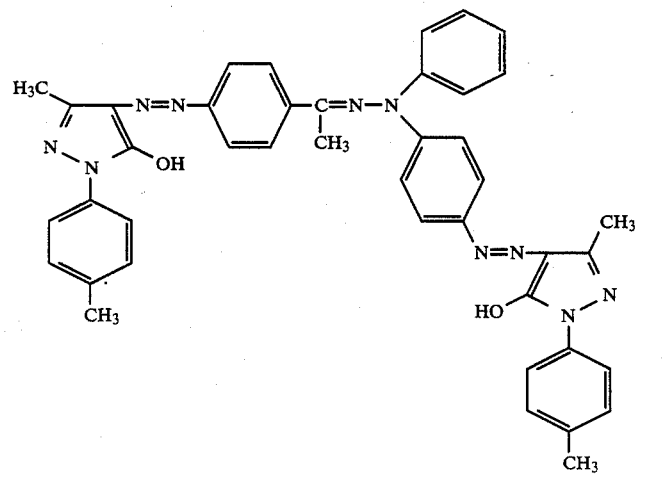
Compound No. 22
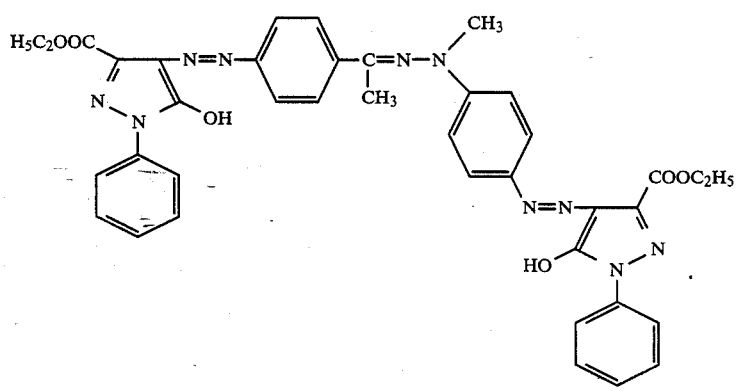
Compound No. 23
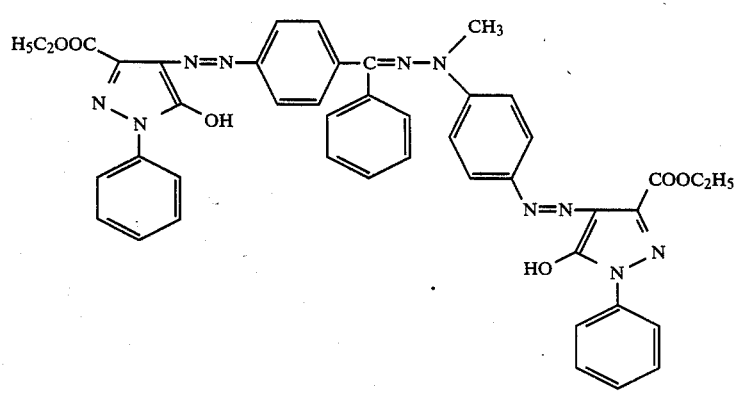
Compound No. 24

-continued
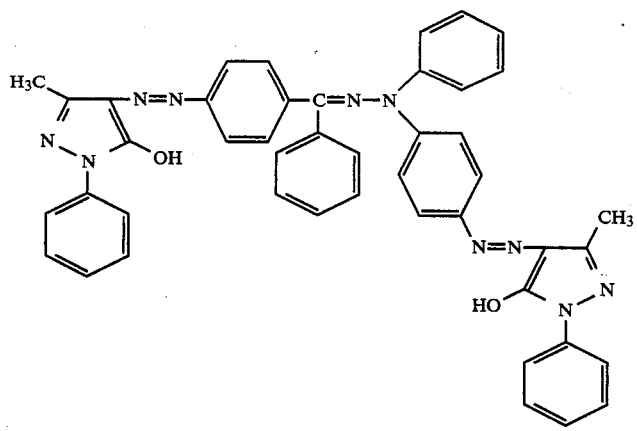
Compound No. 25
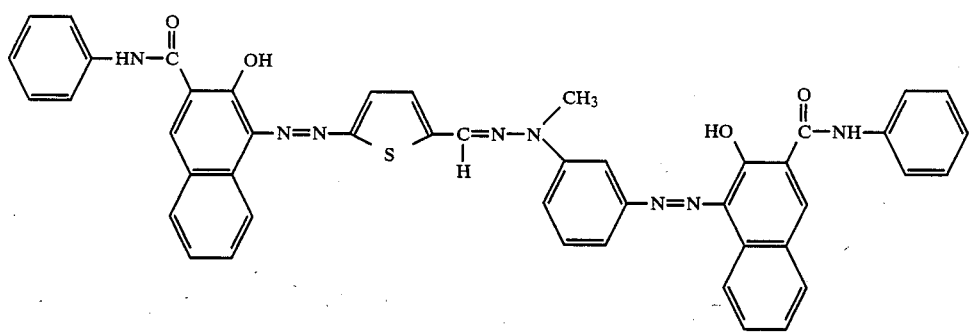
Compound No. 26
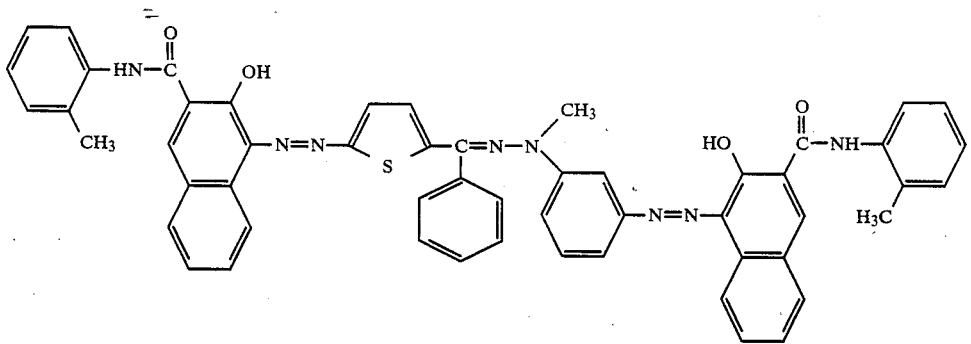
Compound No. 27
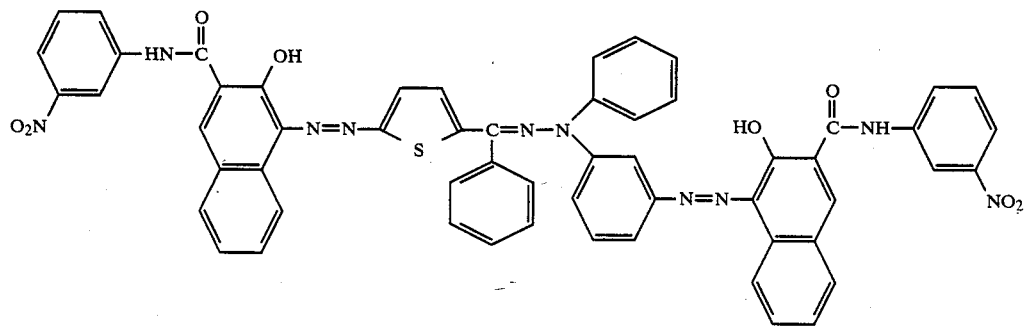
Compound No. 28

-continued
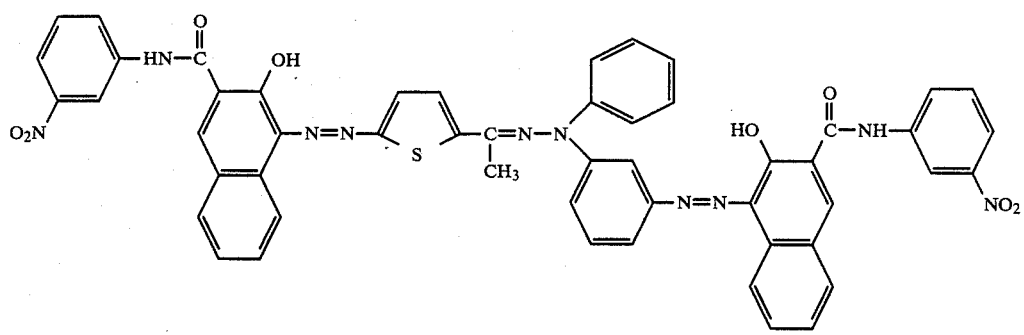
Compound No. 29
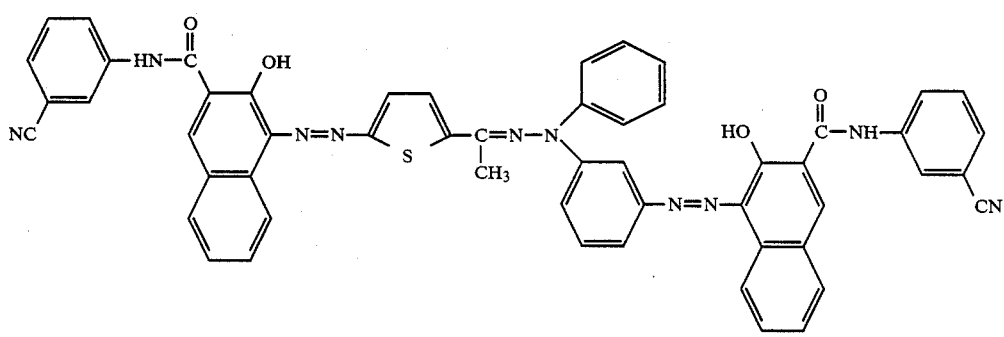
Compound No. 30
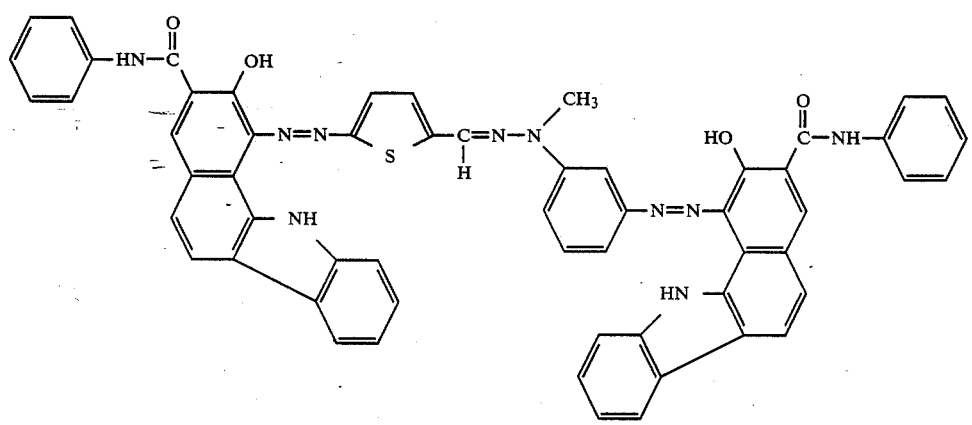
Compound No. 31
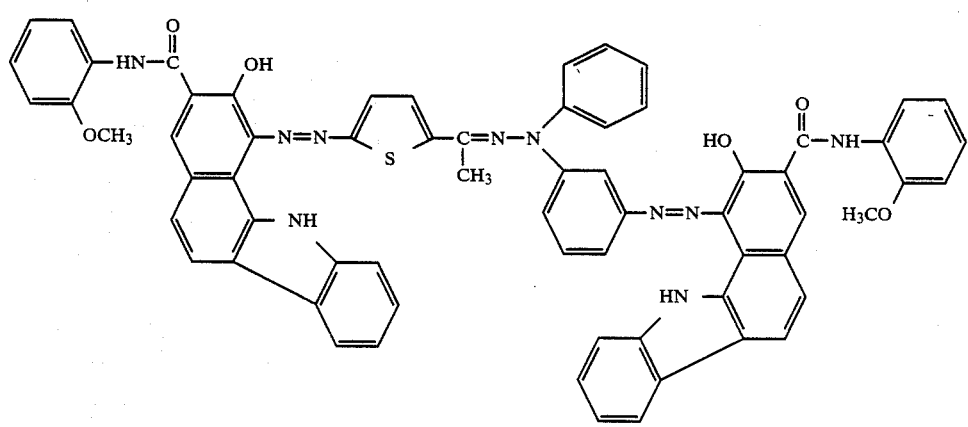
Compound No. 32

-continued

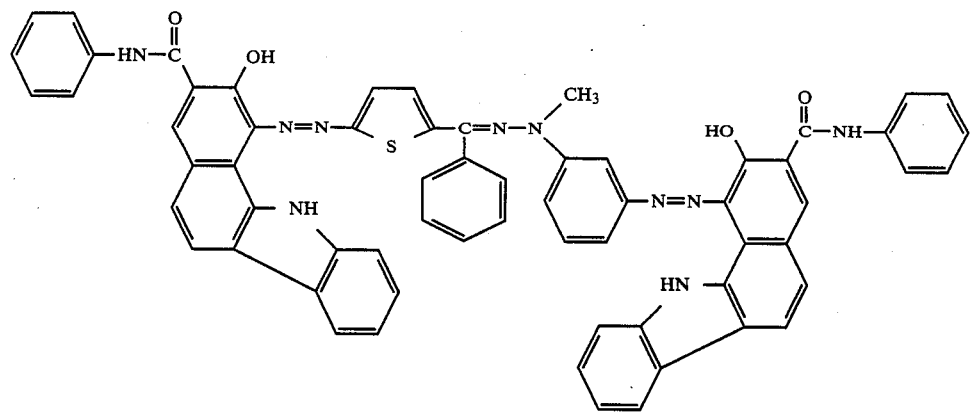
Compound No. 33

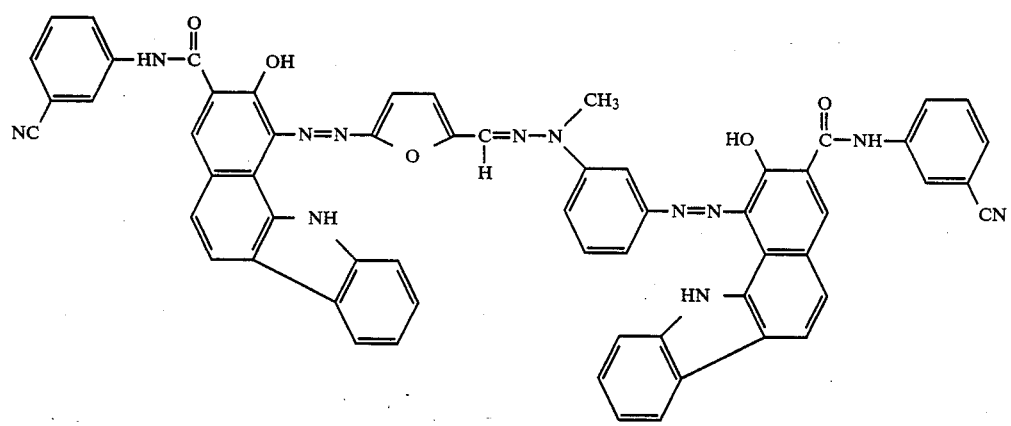
Compound No. 34

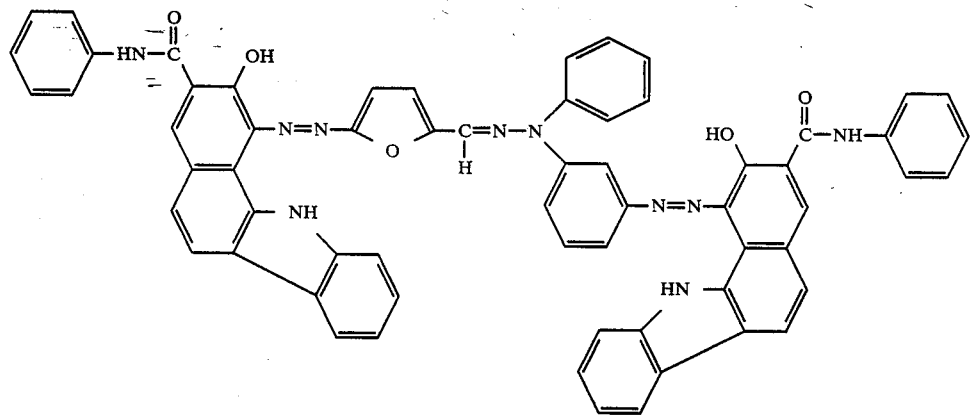
Compound No. 35

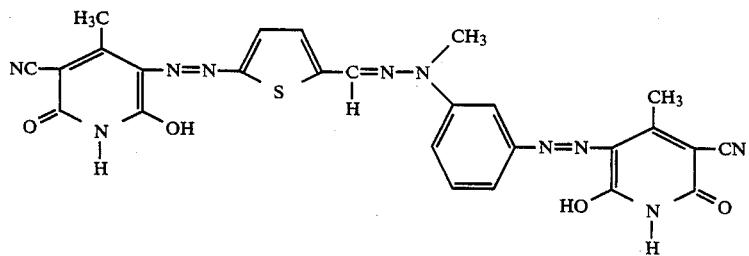
Compound No. 36

EXAMPLE 1

50 parts by weight of the azo compound No. 1, 100 parts by weight of a polyester resin (Vylon 200, manufactured by Toyobo Co., Ltd.) and 100 parts by weight of 1-phenyl-3-(p-diethylaminostyryl)-5-(p-diethylaminophenyl)-2-pyrazoline (ASPP) are mixed with tetrahydrofuran (THF) as a solvent with a mixer for 3 hours to prepare a coating liquid. The coating liquid was applied on an aluminum-deposited polyester film (Al-PET) as an electroconductive substrate by means of the wire bar technique to form a photosensitive layer having a dry thickness of 15 μm. Thus, a photoconductor was produced.

EXAMPLE 2

A solution of 100 parts by weight of p-diethylaminobenzaldehyde-diphenylhydrazone (ABPH) in 700 parts by weight of tetrahydrofuran (THF) was mixed with a solution of 100 parts by weight of polycarbonate resin (Panlite L-1250) in 700 parts by weight of mixed solvent including the same parts of THF and dichloromethane to prepare a coating liquid. The coating liquid was applied on an aluminum-deposited polyester film substrate by the wire bar technique to form a charge transporting layer having a dry thickness of 15 μm. 50 parts by weight of azo compound No. 1, 50 parts by weight of a polyester resin (Vylon 200), and 50 parts by weight of PMMA were kneaded with a mixer for 3 hours together with THF as a solvent to prepare a coating liquid, which was then applied on the charge transporting layer by the wire bar technique to form a charge generating layer having a dry thickness of 0.5 μm. Thus, a photoconductor was produced.

EXAMPLE 3

A charge transporting layer was produced by forming a photosensitive layer in substantially the same manner as in Example 2 except that α-phenyl-1-4′-N,N-dimethylaminostilbene, which is a styryl compound, was used to replace ABPH as a charge transporting substance. Then a charge generating layer was formed on the charge transporting layer, thus a photoconductor was produced.

EXAMPLE 4

A charge transporting layer was produced by forming a photosensitive layer in substantially the same manner as in Example 2 except that tri(p-toryl)amine, which is a triphenylamine compound, was used to replace ABPH as a charge transporting substance. Then a charge generating layer was formed on the charge transporting layer, thus a photoconductor was produced.

EXAMPLE 5

A charge transporting layer was produced by forming a photosensitive layer in substantially the same manner as in Example 2 except that 2,5-bis(p-diethylaminophenyl)-1,3,4-oxadiazole, which is a oxadiazole compound, was used to replace ABPH as a charge transporting substance. Then a charge generating layer was formed on the charge transporting layer, thus a photoconductor was produced.

The electrophotographic characteristics of the five photoconductors thus produced were measured by utilizing an electrostatic recording paper testing apparatus (Kawaguchi Denki Model SP-428).

The surface potential $V_s$ (volts) of each photoconductor is an initial surface potential which was measured when the surface of the photoconductor was positively charged in the dark by corona discharge at $+6.0$ kV for 10 seconds. After the discontinuation of the corona discharge, the member was allowed to stand in the dark for 2 seconds, after which the surface potential $V_d$ (volts) of the member was measured. Subsequently, the surface of the photoconductor was irradiated with white light at an illuminance of 2 luxes and the time (seconds) required for the irradiation to decrease the surface potential of the member to half of the $V_d$ was measured, then from which time and the illuminance the half decay exposure amount $E_{\frac{1}{2}}$ (lux.sec) was calculated. Also, the surface potential of the member after 10 seconds of irradiation thereof with white light at an illuminance of 2 luxes was measured as a residual potential $V_r$ (volts).

TABLE 1

| Example | $V_s$ (Volts) | $V_r$ (Volts) | $E_{\frac{1}{2}}$ (lux.sec) |
|---|---|---|---|
| 1 | 650 | 150 | 5.6 |
| 2 | 630 | 130 | 7.3 |
| 3 | 640 | 160 | 6.9 |
| 4 | 630 | 165 | 5.9 |
| 5 | 625 | 145 | 7.1 |

As can be seen in Table 1, the photoconductors of Examples 1, 2, 3, 4 and 5 have good characteristics in the half decay exposure amounts and the residual potentials.

EXAMPLE 6

100 parts by weight of each of respective azo compounds Nos. from 2 to 75 and 100 parts by weight of polyester were mixed with THF as a solvent with a mixer for 3 hours to prepare a coating liquid. The respective coating liquids were applied on aluminum substrates to form a photogenerating layer having a thickness of about 0.5 μm. Further, the coating liquid described in Example 2, which includes ASPP as a charge transporting substance, was applied on the respective charge generating layer having a thickness of about 15 μm, thus photoconductors were produced.

The electrophotographic characteristic of the photoconductors thus produced were measured by utilizing an electrostatic recording paper testing apparatus SP-428. The results of the measurements are shown in Table 2.

The surface potential $V_d$ (volts) was measured when the surface of a photoconductor was negatively charged by the corona discharge at $-6.0$ kV for 10 seconds and subsequently the photoconductor was allowed to stand in the dark for 2 seconds after the discontinuation of the corona discharge. Thereafter, the surface of the photoconductor was irradiated with white light at an illuminance of 2 luxes and the time (seconds) required to reduce the surface potential of the photoconductor to a half of the $V_d$ was measured, then from which the half decay exposrue amount $E_{\frac{1}{2}}$ (lux.sec) was calculated. Also, the surface potential of the photoconductor after 10 seconds of irradiation thereof with white light at an illuminance of 2 luxes was measured as a residual potential $V_r$ (volts). Good results are obtained with respect to the half decay exposure amounts and the residual potentials.

TABLE 2

| Compound No. | $E_{\frac{1}{2}}$ (lux.sec) | $V_r$ (volt)(−) |
|---|---|---|
| 2 | 5.9 | 110 |
| 3 | 7.8 | 130 |
| 4 | 8.1 | 140 |
| 5 | 6.9 | 150 |
| 6 | 7.3 | 150 |
| 7 | 7.5 | 160 |
| 8 | 7.1 | 160 |
| 9 | 8.5 | 170 |

TABLE 2-continued

| Compound No. | $E_{\frac{1}{2}}$ (lux.sec) | $V_r$ (volt)(−) |
|---|---|---|
| 10 | 9.1 | 160 |
| 11 | 7.7 | 155 |
| 12 | 7.7 | 160 |
| 13 | 7.1 | 145 |
| 14 | 8.4 | 175 |
| 15 | 6.9 | 140 |
| 16 | 8.5 | 135 |
| 17 | 7.9 | 150 |
| 18 | 8.1 | 150 |
| 19 | 8.2 | 155 |
| 20 | 8.2 | 150 |
| 21 | 9.1 | 170 |
| 22 | 9.1 | 165 |
| 23 | 9.0 | 160 |
| 24 | 8.7 | 155 |
| 25 | 8.5 | 155 |
| 26 | 7.9 | 140 |
| 27 | 6.9 | 135 |
| 28 | 7.2 | 130 |
| 29 | 7.3 | 140 |
| 30 | 7.1 | 135 |
| 31 | 7.2 | 140 |
| 32 | 6.9 | 130 |
| 33 | 6.6 | 120 |
| 34 | 6.5 | 125 |
| 35 | 6.9 | 150 |
| 36 | 7.1 | 135 |
| 37 | 6.5 | 140 |
| 38 | 7.5 | 155 |
| 39 | 7.2 | 160 |
| 40 | 6.9 | 135 |
| 41 | 8.1 | 170 |
| 42 | 8.1 | 175 |
| 43 | 7.7 | 165 |
| 44 | 7.6 | 170 |
| 45 | 7.4 | 155 |
| 46 | 7.3 | 145 |
| 47 | 7.1 | 140 |
| 48 | 6.5 | 145 |
| 49 | 6.9 | 130 |
| 50 | 6.9 | 135 |
| 51 | 8.1 | 160 |
| 52 | 8.3 | 150 |
| 53 | 8.1 | 160 |
| 54 | 7.9 | 170 |
| 55 | 7.8 | 170 |
| 56 | 6.9 | 150 |
| 57 | 6.8 | 140 |
| 58 | 6.9 | 145 |
| 59 | 7.3 | 150 |
| 60 | 7.5 | 165 |
| 61 | 7.4 | 135 |
| 62 | 7.3 | 140 |
| 63 | 7.1 | 145 |
| 64 | 6.9 | 160 |
| 65 | 6.8 | 145 |
| 66 | 6.9 | 155 |
| 67 | 7.1 | 160 |
| 68 | 7.3 | 135 |
| 69 | 7.5 | 120 |
| 70 | 7.5 | 140 |
| 71 | 7.3 | 145 |
| 72 | 7.1 | 150 |
| 73 | 6.6 | 155 |
| 74 | 6.9 | 160 |
| 75 | 6.8 | 180 |

As described above, according to the present invention, since an azo compound represented by any one of the aforementioned chemical formulae is used in a photosensitive layer formed on an electroconductive substrate, as a charge generating substance, a photoconductor shows a high sensitive characteristics when adapted to either a positive charge mode or a negative charge mode. If necessary, a covering layer may be provided on the surface of a photoconductor to improve the durability thereof.

The invention has been described in detail with respect to preferred embodiments, and it will now be apparent from the foregoing to those skilled in the art that changes and modifications may be made without departing from the invention in its broader aspects, and it is the invention, therefore, in the appended claims to cover all such changes and modifications as fall within the true spirit of the invention.

What is claimed is:

1. A photoconductor for electrophotography comprising:

at least one disazo compound represented by the following general formula (I):

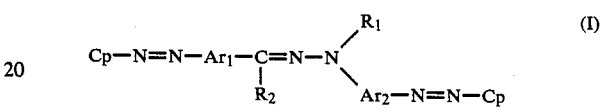

wherein, each of $Ar_1$ and $Ar_2$ stands for an aromatic hydrocarbon group, an aromatic heterocyclic group, each of which may have a substituent(s);

each of $R_1$ and $R_2$ stands for a hydrogen atom or an alkyl group, an aryl group or a heterocyclic group, each of which may have a substituent(s); and $C_p$ stands for a coupler residual group.

2. A photoconductor as claimed in claim 1, wherein said coupler residual group $C_p$ has one of the structures represented by the following general formulae (II) to (V);

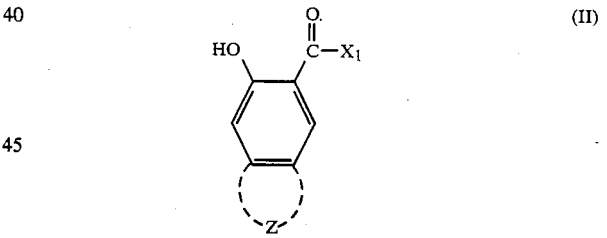

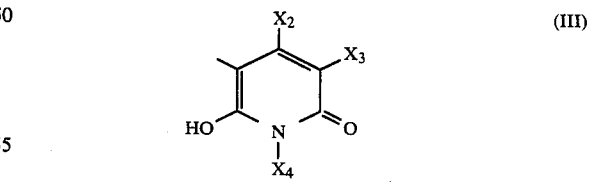

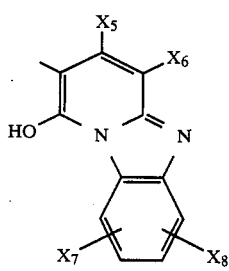

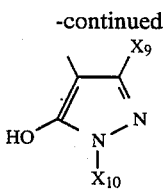 (V)

wherein,
Z stands for a residual group which forms a polycyclic armoatic ring or heterocyclic ring by condensating with a benzene ring, $X_1$ stands for an $OR_3$ or $NR_4R_5$ (each of $R_3$, $R_4$ and $R_5$ stands for a hydrogen atom, an alkyl group, an aryl group or an aromatic heterocyclic group;

each of $X_2$ and $X_5$ stands for an alkyl group, an aryl group, an aromatic heterocyclic group, each of which may have a substituent(s), each of $X_3$ and $X_6$ stands for a hydrogen atom, a cyano group, a carbamoyl group, a carboxyl group, an ester group or an acyl group, $X_4$ stands for a hydrogen atom, an alkyl group, a cycloalkyl group, an alkenyl group, an aryl group, an aromatic heterocyclic group, each of which may have a substituent(s), each of $X_7$ and $X_8$ stands for a hydrogen atom, a halogen atom, a nitro group, an alkyl group or an alkoxy group.which may have a substituent(s), $X_9$ stands for an alkyl group, an aryl group, an carboxy group; and X stands for an aryl group or an aromatic heterocyclic group, both of which may have a substituent(s).

3. A photoconductor as claimed in claim 1; wherein said photoconductor comprising including a dispersion of a charge generating substance selected from disazo compounds represented by the general formula (I) and a charge transporting substance in a binder resin.

4. A photoconductor as claimed in claim 1, wherein said photoconductor comprises a laminate of a charge transporting layer mainly composed of a charge transporting substance and a charge generating layer including a compound selected from disazo compounds represented by the general formula (I).

* * * * *